United States Patent
Eddington et al.

(10) Patent No.: US 9,767,005 B2
(45) Date of Patent: *Sep. 19, 2017

(54) METAPHOR BASED LANGUAGE FUZZING OF COMPUTER CODE

(71) Applicant: PEACH FUZZER LLC, Seattle, WA (US)

(72) Inventors: Michael Eddington, Seattle, WA (US); Adam Cecchetti, Seattle, WA (US)

(73) Assignee: PEACH FUZZER LLC, Seattle, WA (US)

( * ) Notice: Subject to any disclaimer, the term of this patent is extended or adjusted under 35 U.S.C. 154(b) by 110 days.

This patent is subject to a terminal disclaimer.

(21) Appl. No.: 14/791,209

(22) Filed: Jul. 2, 2015

(65) Prior Publication Data

US 2015/0309914 A1 Oct. 29, 2015

Related U.S. Application Data

(63) Continuation of application No. 14/309,841, filed on Jun. 19, 2014, now Pat. No. 9,098,352.

(Continued)

(51) Int. Cl.
*G06F 9/45* (2006.01)
*G06F 11/36* (2006.01)
(Continued)

(52) U.S. Cl.
CPC ........... *G06F 11/3624* (2013.01); *G06F 8/51* (2013.01); *G06F 11/263* (2013.01);
(Continued)

(58) Field of Classification Search
CPC ................... G06F 8/51–8/53; G06F 11/3624
(Continued)

(56) References Cited

U.S. PATENT DOCUMENTS 5,146,591 A * 9/1992 Bachman .................. G06F 8/20
707/955
5,687,376 A 11/1997 Celi, Jr. et al.
(Continued)

OTHER PUBLICATIONS

Baumer et al, "Fostering Metaphorical Creativity Using Computational Metaphor Identification", ACM, pp. 315-324, 2009.*
(Continued)

*Primary Examiner* — Anil Khatri
(74) *Attorney, Agent, or Firm* — Amin, Turocy & Watson, LLP

(57) ABSTRACT

The disclosed subject matter provides for software testing using metaphor based language fuzzing. Metaphor based language fuzzing can decompose a code segment into a metaphor representing the code segment. The metaphor can be mutated based on determined logical perturbations to any element of the metaphor. The mutation of the metaphor can act as a surrogate for mutation of the code segment. The mutated metaphor can be analyzed to reveal performance differences in comparison to the code segment. These performance difference can be correlated to mutation of the metaphor such that a corresponding mutation of the code segment can be correlated by extrapolation. Moreover, mutators can be stored and reused on other metaphors. Furthermore, employing a metaphor as a root language surrogate can facilitate generating a reduced number of mutators as compared to directly mutating code segments in a plurality of computer languages.

20 Claims, 12 Drawing Sheets

Related U.S. Application Data

(60) Provisional application No. 61/847,514, filed on Jul. 17, 2013.

(51) Int. Cl.
*G06F 11/263* (2006.01)
*G06F 21/57* (2013.01)
*G06F 11/34* (2006.01)

(52) U.S. Cl.
CPC ...... *G06F 11/3428* (2013.01); *G06F 11/3452* (2013.01); *G06F 21/577* (2013.01); *G06F 2201/865* (2013.01); *G06F 2221/033* (2013.01)

(58) Field of Classification Search
USPC .................................. 717/123–130, 135–141
See application file for complete search history.

(56) References Cited

U.S. PATENT DOCUMENTS

| | | | |
|---|---|---|---|
| 5,907,704 A * | 5/1999 | Gudmundson ... | G06F 17/30014 707/E17.013 |
| 6,226,620 B1 | 5/2001 | Oon | |
| 6,341,392 B1 * | 1/2002 | Makinen ............ | A47C 17/1753 5/43 |
| 6,606,742 B1 * | 8/2003 | Orton ........................ | G06F 8/70 712/E9.082 |
| 6,651,243 B1 | 11/2003 | Berry et al. | |
| 6,662,358 B1 * | 12/2003 | Berry ...................... | G06F 17/30 714/47.2 |
| 6,721,942 B1 * | 4/2004 | Sievert .................... | G06F 9/443 712/E9.084 |
| 6,839,698 B2 | 1/2005 | Nguyen et al. | |
| 7,013,456 B1 * | 3/2006 | Van Dyke ........... | G06F 9/45533 712/208 |
| 7,254,806 B1 * | 8/2007 | Yates, Jr. ............ | G06F 9/45554 712/227 |
| 7,343,594 B1 * | 3/2008 | Metzgen ............. | G06F 17/5054 717/140 |
| 7,373,550 B2 | 5/2008 | Brawn et al. | |
| 7,421,681 B2 * | 9/2008 | DeWitt, Jr. ......... | G06F 9/30181 712/E9.035 |
| 7,454,745 B2 * | 11/2008 | Aridor ...................... | G06F 8/71 707/999.202 |
| 7,703,084 B2 * | 4/2010 | Lindhorst ................. | G06F 8/20 715/234 |
| 7,716,654 B2 * | 5/2010 | Fleming ................ | G06F 9/4443 703/26 |
| 7,730,450 B2 | 6/2010 | Mercer | |
| 7,735,068 B2 * | 6/2010 | Siddaramappa .......... | G06F 8/10 715/230 |
| 7,779,394 B2 * | 8/2010 | Homing .................. | G06F 21/14 713/182 |
| 7,823,929 B2 * | 11/2010 | Hoff ...................... | F16L 27/087 285/121.3 |
| 7,886,283 B2 * | 2/2011 | Nacul ..................... | G06F 8/456 717/137 |
| 7,926,114 B2 | 4/2011 | Neystadt et al. | |
| 8,015,554 B2 | 9/2011 | Varma | |
| 8,141,054 B2 | 3/2012 | Dolby et al. | |
| 8,381,192 B1 | 2/2013 | Drewry et al. | |
| 8,694,968 B2 * | 4/2014 | Eteminan .................. | G06F 8/20 717/103 |
| 8,713,515 B1 * | 4/2014 | Biggerstaff ............... | G06F 8/72 717/104 |
| 8,797,222 B2 * | 8/2014 | Chamseddine ...... | H01Q 13/106 343/767 |
| 8,832,665 B2 * | 9/2014 | Greifeneder ........ | G06F 11/3495 717/127 |
| 8,850,411 B2 * | 9/2014 | Kelem ................ | G06F 15/7867 717/140 |
| 8,856,758 B2 * | 10/2014 | Lei ...................... | G06F 9/44521 717/136 |

OTHER PUBLICATIONS

Milner, "A Broken Metaphor in Java", ACM-SIGCSE Bulletin, 76, vol. 41, No. 4, pp. 76-77, 2009.*
Kapoor et al, "Decomposing Specifications with Concurrent Outputs to Resolve State Coding Conflicts in Asynchronous Logic Synthesis", ACM, pp. 830-833, 2004.*
Pyla, "Composing Locks by Decomposing Deadlocks", ACM, pp. 67-69, 2011.*
Whalen, "High-Integrity Code Generation forState-Based Formalisms", ACM, pp. 725-727, 2000.*
Djelloul, "Combination of Decomposability and Propagation for Solving FirstOrder Constraints in Decomposable Theories", ACM, pp. 1728-173, 2008.*
Tan et al, "Combining Error-Correcting Output Codes and Model-Refinement for Text Categorization", ACM, pp. 699-700, 2007.*
Holler, Christian. "Grammar-Based Interpreter Fuzz Testing". Master's Thesis, Saarland University Faculty of Natural Sciences and Technology I, Department of Computer Science, Master's Program in Computer Science, Jun. 30, 2011, published online at [https://users.own-hero.net/~decoder/holler-mthesis-2011.pdf], retrieved on Sep. 18, 2014, 46 pages.
Heelan, Sean. "Better Interpreter Fuzzing with Clang". Sean Heelan's Blog, Jul. 10, 2012. Published online at [http://seanhn.wordpress.com/2012/07/10/better-interpreter-fuzzing-with-clang/], retrieved on Sep. 22, 2014, 7 pages.
Rohlf, et al. "Attacking Clientside JIT Compilers". Matasano Security. Published online at [http://www.matasano.com/research/Attacking_Clientside_JIT_Compilers_Paper.pdf], retrieved on Sep. 18, 2014, 34 pages.
Yang, et al., "Finding and Understanding Bugs in C Compilers", Proceedings of the 2011 ACM SIGPLAN Conference on Programming Language Design and Implementation (PLDI), San Jose, CA, Jun. 2011. Published online at [http://www.cs.utah.edu/~regehr/papers/pldi11-preprint.pdf], retrieved on Sep. 18, 2014, 12 pages.
Godefroid, et al. "Grammar-based Whitebox Fuzzing", PLDI'08, Jun. 7-13, 2008, Tucson, Arizona, published online at [http://research.microsoft.com/en-us/projects/atg/pldi2008.pdf], retrieved on Sep. 18, 2014, 10 pages.
European Search Report dated Nov. 19, 2014 for European Application No. 14175419.2-1954, 10 pages.
King, et al., "A Fortran Language System for Mutation-Based Software Testing". Software Practice & Experience, Wiley & Sons, Bognor Regis, GB, vol. 21, No. 7, Jul. 1, 1991, pp. 685-718.
Spinellis, et al., "Comparative Language Fuzz Testing: Programming Languages vs. Fat Fingers", Plateau '12: Proceedings of the ACM 4th annual workshop on Evaluation and usability of programming languages and tools, Oct. 21, 2012, Tucson, Arizona, pp. 25-34.
Notice of Allowance mailed Mar. 30, 2015 for U.S. Appl. No. 14/309,841, 29 pages.
Westbrook et al, "Mint: Java Multi-stage Programming Using Weak Separability", ACM, pp. 400-411, 2010.
Tang et al, "Automatic Metaphor Recognition Based on Semantic Relation Patterns", IEEE, pp. 95-100, 2010.
Sosnowka "Test City metaphor as support for visual testcase analysis within integration test domain", IEEE, pp. 1365-1370, 2013.
Schulz et al, "Discovering User-Generated Metaphors Through Usability Testing", IEEE, vol. 40, No. 4, pp. 255-264, 1997.
Gligoric et al, "Selective Mutation Testing for Concurrent Code", ACM, pp. 224-234, 2013.
Jalbert et al, "Predicting Mutation Score Using Source Code and Test Suite Metrics", IEEE, pp. 42-46, 2012.
Roy et al, "Towards a Mutation-Based Automatic Framework for Evaluating Code Clone Detection Tools", ACM, pp. 137-140, 2008.
Becker et al, "XEMU: An Efficient QEMU Based Binary Mutation Testing Framework for Embedded Software", ACM, pp. 33-42, 2012.

* cited by examiner

US 9,767,005 B2

METAPHOR BASED LANGUAGE FUZZING OF COMPUTER CODE

CROSS-REFERENCE TO RELATED APPLICATIONS

The present application is a continuation of, and claims priority to each of, U.S. patent application. Ser. No. 14/309,841 (now U.S. Pat. No. 9,098,352), filed Jun. 19, 2014, and entitled "METAPHOR BASED LANGUAGE FUZZING OF COMPUTER CODE," which claims priority to U.S. Provisional Patent Application No. 61/847,514," filed on Jul. 17, 2013, and entitled "FUZZING OF LANGUAGE FRAMEWORKS, PARSERS, AND/OR RUNTIMES" which applications are hereby incorporated by reference herein in their respective entireties.

TECHNICAL FIELD

The disclosed subject matter relates to software testing and, more particularly, to analysis related to perturbation of representations of elements of software under test.

BACKGROUND

By way of brief background, code testing can generally be employed to determine characteristics of aspects of code or code segments under test. As an example, one use of code testing is to determine potential security problems of the code under test. As another example, code testing can check for crashes, failing assertions, memory leaks, or other bugs. Code testing can take many forms. These code testing forms can include manual perturbation of data passed into the code under test. As an example, where the code under test accesses a variable and expects a 16-bit value to be passed into the code under test, manual perturbation of the variable can provide the code under test with an 8-bit or 32-bit value. The results of the data variable perturbation on the code under test can be monitored to determine if the code under test responds to the perturbed data variable in an expected or unexpected manner. This insight into the behavior of the code under test can provide for improvement of the code under test to account for the types of perturbations provided to inputs into the code under test. Of note, manual perturbation of data variables can be laborious and slow. As such, automated data input perturbation techniques have been developed and, as a class, can be referred to as "fuzzing techniques", wherein an input variable can be perturbed or "fuzzed".

DETAILED DESCRIPTION

Figure 1:
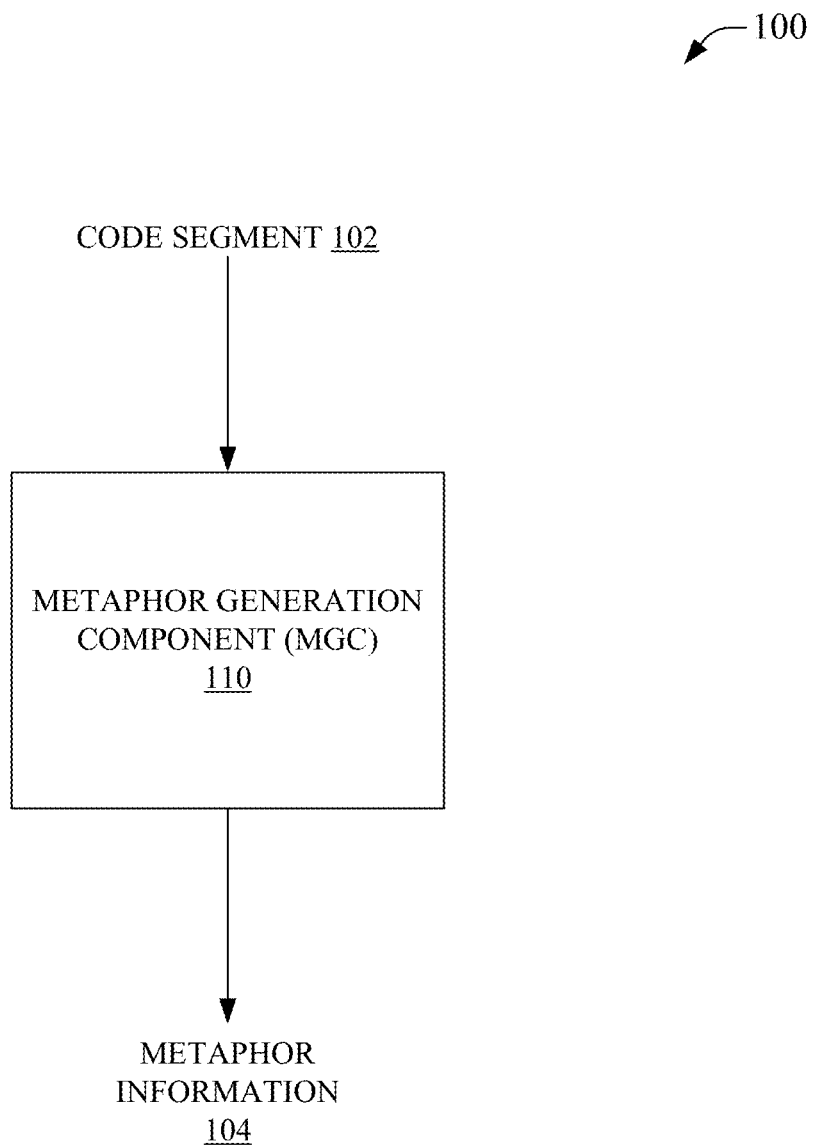
FIG. 1 is an illustration of a system that facilitates code segment analysis by facilitating access to metaphor information related to the code segment in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Software testing can be employed to determine characteristics of software under test. Common uses of software testing can include determining potential security problems, checking for crashes, failing assertions, or memory leaks, or other bugs in software under test (SUT). One software testing technique can be "fuzzing" (or "fuzz testing"), which can include automated or semi-automated perturbation of inputs to SUT, e.g., providing invalid, unexpected, or random data as an input to the SUT. As disclosed herein below, conventional fuzzing can be expanded to comprise fuzzing of the code or portions of code, e.g., code segments, in addition to fuzzing data passed into the SUT. As an example, a code segment that creates a variable, accesses a value and then assigns the value to the variable, and then prints the variable, can be fuzzed by fuzzing the value and/or fuzzing the codes segment itself. Fuzzing the value that is accessed and assigned to the variable, as in more conventional fuzzing, can, for example, pass in a string, a double, an integer, a memory location etc., without any fuzzing of the code segment itself. Correspondingly, as disclosed herein, fuzzing can be extended to encompass mutation of the code segment itself, independent of fuzzing the data, in combination with fuzzing the data, or inclusive of fuzzing the data. Fuzzing the code segment can, for example, include changing the print function to a display function, designating the variable type as a pointer, designating multiple variables rather than just one, etc. Nearly a limitless number of mutations can be applied to the code segment itself which can affect the execution of the code segment in contrast to the original code segment. Fuzzing code segments can facilitate identification of issues, for example, in interpreted language run times, heap corruption, use-after-free bugs, memory disclosure, etc. Software testers can, under the extended fuzzing paradigm, mutate both data passed into code and the code itself.

Fuzz testing can be performed by 'fuzzers'. Fuzzers can 'fuzz' input for a SUT of the code comprising the SUT itself. A 'fuzzer' can be a system, method, device, etc., related to fuzzing. To 'fuzz' can include perturbation of input to a SUT, including perturbation of a set of input data, e.g., a determined data set comprising perturbed inputs can be termed 'fuzzed data', a 'fuzz data file', or similar language. To 'fuzz' can further include perturbation of code, or a code segment, comprised in the SUT. It is desirable to capture differences in the execution of code or code segments based on fuzz tests of the code or code segment in addition to more conventional fuzzing of data passed into the original code segment and/or a perturbed code segment.

Fuzzing a code segment can be automated, as presently disclosed, to allow for application of a determined mutation technique to an element of the code segment. Elements of code segments are commonly represented in a plurality of code languages, e.g., a "print" type element exists in BASIC™, C++™, PEARL™, VISUAL BASIC™, JAVA™, etc. Language fuzzing, e.g., fuzzing of a code segment itself, can take advantage of the existence of element types across a plurality of code languages. Language fuzzing can employ a metaphor generation component (MGC), e.g., MGC 110, 210, etc., as disclosed herein, to decompose a code segment in a first language into a metaphoric representation of the code segment in a second language, for example, a code segment in JAVASCRIPT™ can be decomposed into a metaphoric representation in JAVASCRIPT™ object notation (JSON™). The metaphoric representation can be termed a "metaphor" of that code segment, or other similar terms herein. A metaphor can be related to links between code grammar, an abstract syntax tree (AST), and common elements of a code segment. The metaphor in the second language can then be mutated based on designated perturbations. The mutated metaphor can remain in the second language. The mutated metaphor can then be composed in a third language. In some instances, the third language can be the same as the first language. In other instances, the third language can be different from the first language or second language. As an example, a code segment in JAVASCRIPT™ can be decomposed into a metaphor in JSON™, mutated in JSON™, and then composed into JAVASCRIPT™. As another example, a code segment in JAVASCRIPT™ can be decomposed into a metaphor in JSON™, mutated in JSON™, and then composed into FLASH™. For simplicity, the balance of the disclosure is generally limits discussion to composing the mutated metaphor into the same language as the code segment, however the disclosure is expressly not so limited.

The decomposition of a code segment into a metaphor in a second language can be beneficial in that a plurality of first languages can be decomposed into the second language, thereby overcoming syntactical differences between similar elements in a plurality of first languages. As such, the functionality of an element of the code segment and an element of the second code segment, being similar, can be represented by the same metaphor in the second language. As an example, a code segment in JAVASCRIPT™ can be decomposed into a metaphor in JSON™ and a second code segment in PEARL™ can be decomposed into another metaphor in JSON™. Where the example code segment is a "print" function in JAVASCRIPT™ and second code segment is a "print" function in PEARL™, the "print" metaphor in JSON™ can equally represent either the JAVASCRIPT™ or PEARL™ "print" function. This example illustrates that the second language can act as a translation layer to represent a similar element written in disparate languages. This can facilitate the development of a mutator to perturb just the metaphor, rather than having to develop a plurality of mutators, each to perturb an element in a disparate language, e.g., rather than having to develop a print-element mutator in JAVASCRIPT™ and PEARL™, a single JSON™ print-element metaphor mutator can be developed. As will be noted, the example JSON™ print-element metaphor mutator can then be applied to a print-element metaphor decomposed from a C++™ print-element, a C#™ print-element, a FLASH™ print-element, an AIR™ print-element, or nearly any other print-element in another language. In an aspect, mutators can be developed in the second language to allow them to be applied to metaphoric representations, e.g., metaphors, of code elements in nearly any first language. Other examples of code segment elements can include, but are expressly not limited to, instantiating an object, calling a method, setting a property, etc.

Mutation can be applied to nearly any aspect of a metaphoric representation of a code segment. These aspects can include code segment functionality, scope, state, representations of expressions, statements, arguments, names, values, etc. It will be noted that perturbation of the metaphor, e.g., mutation of the metaphor, can be applied to any aspect of the code segment embodied in the metaphor. As such, the finer the grain of represented aspects of the code segment embodied in the metaphor, the finer the grain of mutation that can be applied.

A mutated metaphor can be composed into an output language, e.g., a third language. As discussed herein, this disclosure generally limits discussion to the input and output language being the same for the sake of simplicity and clarity. As an example, a code segment in JAVASCRIPT™ can be decomposed into a JSON™ metaphor, which can be mutated and then composed into a mutated code segment in JAVASCRIPT™. This can allow testing of the code segment and mutated code segment in JAVASCRIPT™, thereby reducing the introduction of errors related to testing the input code against the output code in different languages. Of note, the mutated code segment can also be referred to herein as a fuzzed code segment or by similar language.

A mutation strategy or fuzzing strategy can be expressed as logical rules describing perturbation of information, e.g., the metaphor. In an aspect, a library of metaphor mutators can be employed to provide access to a plurality of predetermined fuzzing strategies. In some embodiments, a mutator can be limited to a single type of mutation. In other embodiments, a mutator can include a plurality of mutations to enable multiple types of metaphor perturbation. Language fuzzing can, in some instances facilitate development of tools to target language interpreters, for example, browsers via the JAVASCRIPT™ interpreter in CHROME™, web applications via the RUBY™ interpreter in RUBY ON RAILS™, large application suites via the VISUAL BASIC™ for applications in MICROSOFT OFFICE™, embedded controllers BASIC™ interpreters in LANDIS™ and GYR™ systems, etc. Other possible runtimes can also be language fuzzed.

The following presents other simplified example embodiments of the disclosed subject matter in order to provide a basic understanding of some aspects of the various embodiments. This is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system can include a processor and memory. The processor can facilitate the execution of instructions stored on the memory. The execution of the instructions can cause the processor to perform operations including receiving a code segment in a first computer language and decomposing the code segment into constituent code elements. Metaphoric elements corresponding to the constituent code elements can then be determined. Based on these metaphoric elements, a metaphor, in a second computer language, can be determined that corresponds to the code segment. Access to the metaphor can be facilitated by the system.

In another embodiment, a method can include receiving, by a system including a processor, a code segment in a first language wherein a feature of the code segment can be identified. The method can further comprise determining, by the system, a metaphoric element corresponding to the feature of the code segment and generating, by the system, a metaphor, in a second language, representing the code segment based on the metaphoric element. The method can then facilitate access to the metaphor.

In a further embodiment, a non-transitory computer readable storage medium having instructions stored thereon can, in response to execution, cause a system comprising a processor to perform operations. These operations can comprise receiving a code segment in a first language. They can further comprise identifying a functional aspect of the code segment. The operations can further determine a metaphoric element corresponding to the functional aspect of the code segment and generate, in a second language different from the first language, a metaphor representing the code segment based on the metaphoric element. Access to the metaphor can further be facilitated by the operations.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which facilitates code segment analysis by facilitating access to metaphor information related to the code segment in accordance with aspects of the subject disclosure. System 100 can include metaphor generation component (MGC) 110. MGC 110 can facilitate access to metaphor information 104. Metaphor information 104 can correspond to code segment 102. In an aspect, MGC 110 can receive code segment 102, determine a metaphor of code segment 102 and facilitate access to metaphor information 104 relating to the metaphor or code segment 102. In an aspect, system 100 can facilitate fuzzing language frameworks, parsers, and runtimes.

In an embodiment, code segment 102 can be in a first computer code language, e.g., JAVASCRIPT™, ADOBE AIR™, C++™, etc. Metaphor information 104 can relate to a metaphor representation of code segment 102 in a second language, e.g., JSON™, C#™, XML™, BASIC™, etc. In some instances, the metaphor representation can be in same language as computer code 102. System 100 can facilitate a semi-automated negative testing of languages by defining a generic approach to language fuzzing because implementation of a metaphor is language fuzzing agnostic and further does not require the source code of the target runtime or of the target language to produce a fuzzing definition, e.g., mutator. Moreover, system 100 illustrates operation on code segment 102 that can be a portion of a larger code file. This illustrates that determining a metaphor and facilitating access to metaphor information 104 can be performed on a code segment level thus allowing operation without analysis of a program flow of a target or solving symbolic constraints. It will be noted that the metaphor layer of system 100 as performed by MGC 110 is extensible, such that, if a language has a unique feature, a unique metaphor can be associated with it.

As a non-limiting example, code segment 102 can comprise the following JAVASCRIPT™ code segment:

```
{
    x="\\u0000foobar";
}
```

This code segment can be accessed by MGC 110. MGC can determine a metaphoric representation, e.g., a metaphor, corresponding to the code segment. The example metaphor can be in another language, e.g., JSON™, as follows:

```
{
    Sequence : [
        {
            Metaphors : [
                {
                    CreateVariable : [
                        {
                            Var : [
                                {
                                    Data : "x",
                                    Meta : "global"
                                }
                            ]
                        }
                    ]
                }
            ]
        }
    ]
```

```
        },{
            Sequence : [
            {
                Metaphors : [
                {
                    Sequence : [
                    {
                        Metaphors : [
                        {
                            UpdateVariable : [
                            {
                                Var : [
                                {
                                    Data : "x",
                                    Meta : "global"
                                }
                                ]
                            },{
                                String : [
                                {
                                    Data : "\\u0000foobar"
                                }
                                ]
                            }
                            ]
                        }
                        ]
                    }
                    ]
                }
                ]
            }
            ]
        }
        ]
}
```

The decomposition of a code segment into a metaphor in a second language can be beneficial in that a plurality of first languages can be decomposed into the second language, thereby overcoming syntactical differences between similar elements in a plurality of first languages. Metaphor information 104 can comprise information relating to the example metaphor.

As disclosed herein, the metaphor can be mutated, allowing perturbation of the elements of the metaphor. Continuing the example, UpdateVariable->String can employ string mutators to apply different types of strings, etc. Further, in the example, UpdateVariable->Var can facilitate fuzzing of the variable name or value, etc. Moreover, in the example, CreateVariable can be mutated, e.g., language fuzzed, to create multiple instances of CreateVariable, to expand one of the Sequences to be near some interesting integer values, etc. The mutated or fuzzed metaphor can then be output in a third language (not illustrated), in this example the input code segment 102 language can be the same as the output language, e.g., JAVASCRIPT™, to yield a fuzzed or mutated code sample that can be analyzed for departure from the execution of the input code segment, e.g., code segment 102. For the current metaphor example in JSON™, an output fuzzed code segment in JAVASCRIPT™, without mutation, can be as follows:

```
var x;
{
    x="\\u0000foobar";
}
```

It will be noted that the output fuzzed code segment with mutations would result in JAVASCRIPT™ code reflecting any mutations and are not provided in this example for clarity and brevity given that the possible mutations are numerous and can be complex. It will further be noted the example illustrates a metaphor having a defined scope and associated dependencies. Incorporation of aspects such as scope and dependencies can be further examined with regard to FIG. 2.

Figure 2:
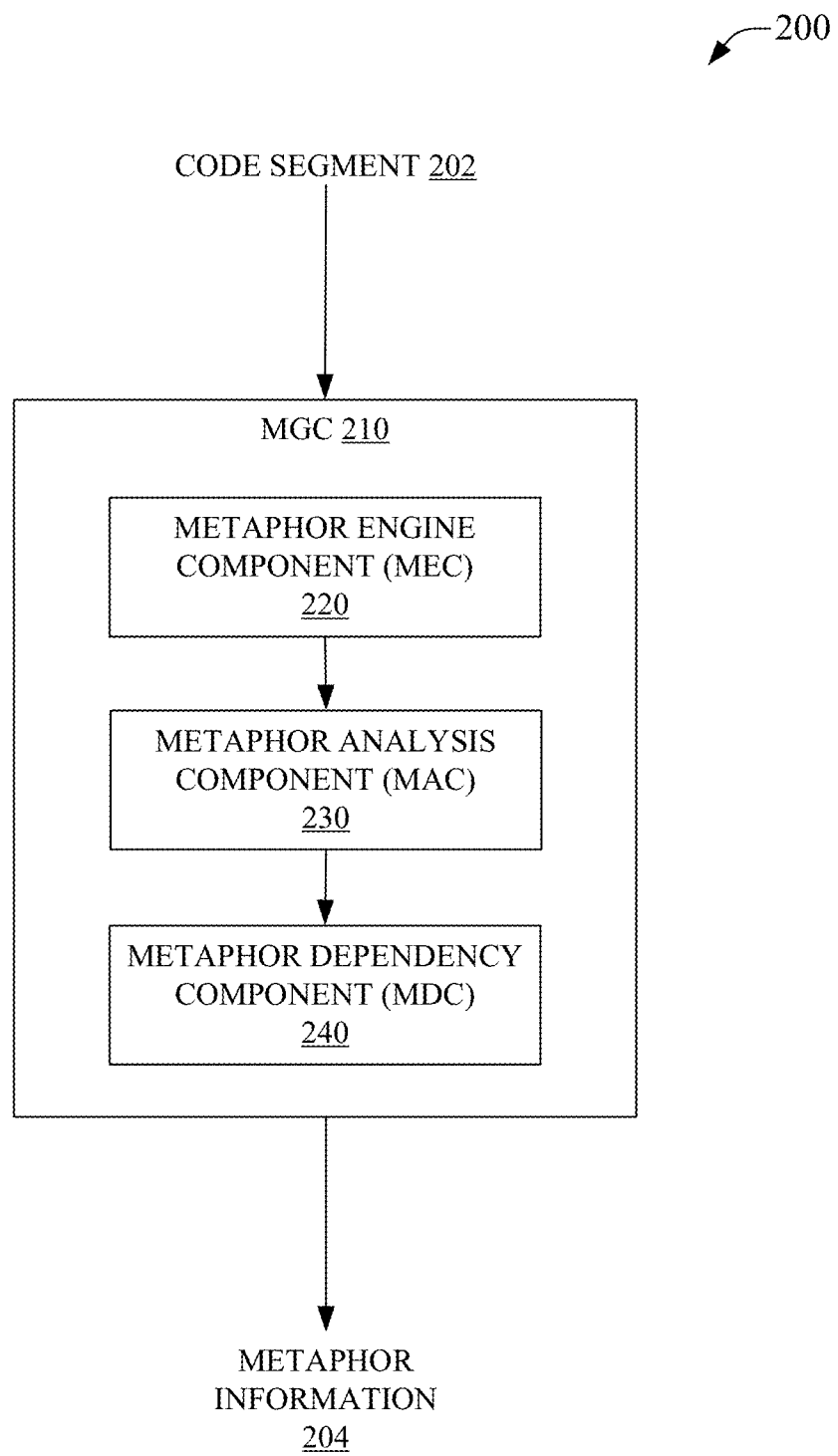
FIG. 2 is a depiction of a system that facilitates code segment analysis by facilitating access to metaphor information, comprising scope and dependency information, related to the code segment in accordance with aspects of the subject disclosure.

FIG. 2 is a depiction of a system 200 that can facilitate code segment analysis by facilitating access to metaphor information, comprising scope and dependency information, related to the code segment in accordance with aspects of the subject disclosure. System 200 can include metaphor generation component (MGC) 210 that can access code segment 202. MGC 210 can further comprise metaphor engine component (MEC) 220. MEC 220 can decompose code segment 202 and determine metaphoric elements that can comprise an initial metaphor framework for code segment 202.

As a non-limiting example, code segment 202 can comprise the following JAVASCRIPT™ code segment:

```
{
    x="\\u0000foobar";
}
```

MEC 220 can decompose code segment 202 into metaphoric elements that can comprise an initial metaphor framework representing code segment 202. This metaphor framework of example code segment 202 can be, for example, represented by the following pseudo code:

```
{
    Sequence : [
        {
            Metaphors : [
                {
                    Sequence : [
                        {
                            Metaphors : [
                                {
                                    Update : [
                                        {
                                            Var : [
                                                {
                                                    Data : "x",
                                                    Meta : "ToBeDetermined"
                                                }
                                            ]
                                        },
                                        {
                                            String : [
                                                {
                                                    Data : "\\u0000foobar"
                                                }
                                            ]
                                        }
                                    ]
                                }
                            ]
                        }
                    ]
                }
            ]
        }
    ]
}
```

Of note, the initial metaphor framework can comprise relationships that are poorly defined without further analysis but that are appropriate in metaphoric representations of elements present in code segment 202, e.g., the "ToBeDetermined" Meta value, etc.

MGC 210 can further comprise metaphor analysis component (MAC) 230. MAC 230 can perform a preliminary analysis of the initial metaphor framework for code segment 202 determined by MEC 220. Continuing the current non-limiting example, analysis of the initial metaphor framework in view of code segment 202 can result in an intermediate metaphor representing code segment 202, for example, such as depicted in the following pseudo code:

```
{
    Sequence : [
        {
            Metaphors : [
                {
                    Sequence : [
                        {
                            Metaphors : [
                                {
                                    UpdateVariable : [
                                        {
                                            Var : [
                                                {
                                                    Data : "x",
                                                    Meta : "global"
                                                }
                                            ]
                                        }, {
                                            String : [
                                                {
                                                    Data : "\\u0000foobar"
                                                }
                                            ]
                                        }
                                    ]
                                }
                            ]
                        }
                    ]
                }
            ]
        }
    ]
}
```

-continued

```
        ]
}
```

The preliminary analysis of the initial metaphor framework for code segment 202 can designate relationships not defined in the initial metaphor framework. As an example, the "ToBeDetermined" Meta value found in the initial metaphor framework can be updated to reflect scope, e.g., Meta: "global", etc.

The intermediate metaphor representing code segment 202 can be received by metaphor dependency component (MDC) 240 comprised in MGC 210. MDC 240 can determine dependencies of the intermediate metaphor and update the intermediate metaphor to generate a metaphor for code segment 202 based on these dependencies. As illustrated by the following pseudo code for the continuing non-limiting example, the metaphor for code segment 202, e.g., comprising dependencies, can, for example, be:

The illustrated pseudo code for the metaphor of code segment 202 depicts dependencies, such as, CreateVariable to support the UpdateVariable, etc., found in the initial metaphor framework and the intermediate metaphor. Adding these dependencies can facilitate effective generation of features needed for an output code segment to execute properly.

The metaphor of code segment 202 generated via MEC 220, MAC 230, and MDC 240, can be made accessible by way of metaphor information 204 as illustrated for system 200. Further, in some embodiments not illustrated in FIG. 2, the metaphor can be mutated as part of language fuzzing code segment 202. Mutated forms of the metaphor generated via MEC 220, MAC 230, and MDC 240, can be composed into an output code segment representing the mutated meta-

```
{
    Sequence : [
        {
            Metaphors : [
                {
                    CreateVariable : [
                        {
                            Var : [
                                {
                                    Data : "x",
                                    Meta : "global"
                                }
                            ]
                        }
                    ]
                },{
                    Sequence : [
                        {
                            Metaphors : [
                                {
                                    Sequence : [
                                        {
                                            Metaphors : [
                                                {
                                                    UpdateVariable : [
                                                        {
                                                            Var : [
                                                                {
                                                                    Data : "x",
                                                                    Meta : "global"
                                                                }
                                                            ]
                                                        }, {
                                                            String : [
                                                                {
                                                                    Data : "\\u0000foobar"
                                                                }
                                                            ]
                                                        }
                                                    ]
                                                }
                                            ]
                                        }
                                    ]
                                }
                            ]
                        }
                    ]
                }
            ]
        }
    ]
}
``` phor. This output code segment therefore can also be viewed as representing a language fuzz of code segment 202 via a metaphor intermediary that is subject to mutation. Continuing the current example, an example output code segment, based on the unmutated example metaphor of code segment 202, can be similar to the following pseudo code:

```
var x;
{
    x="\\u0000foobar";
}
```

This example output code segment illustrates the inclusion of "var x;" related to the inclusion of the "CreateVariable" dependency in the example metaphor. It will be noted that a fuzzed output code segment, e.g., representing mutation of the metaphor of code segment 202, would generally comprise additional code reflecting said mutated elements, however, an example is not herein provided for clarity and brevity given the numerous possible mutations and potential for increasingly complex output code.

Figure 3:
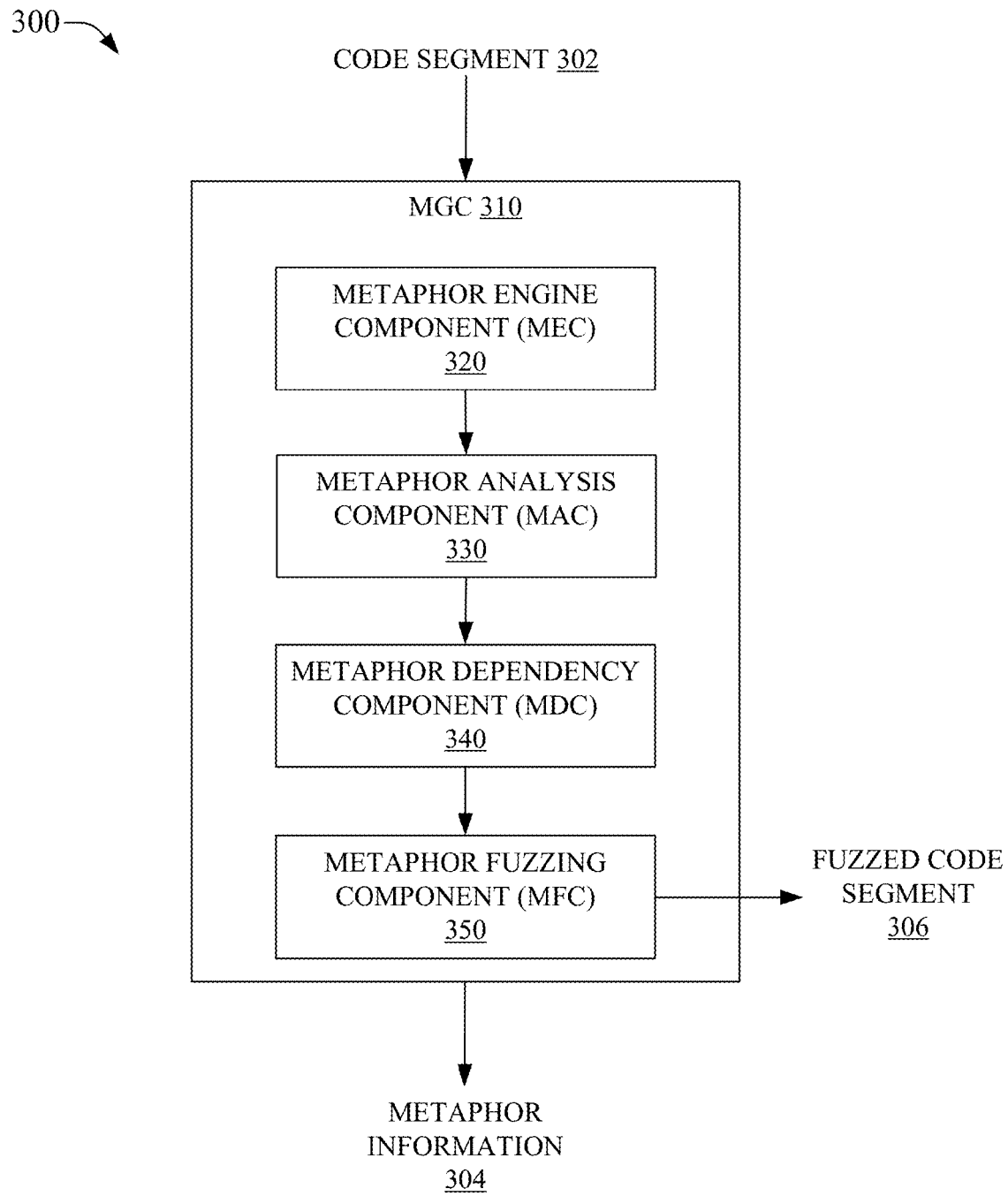
FIG. 3 illustrates a system that facilitates code segment analysis by facilitating access to metaphor information related to the code segment and a fuzzed code segment in accordance with aspects of the subject disclosure.

FIG. 3 illustrates a system 300 that facilitates code segment analysis by facilitating access to metaphor information related to the code segment and a fuzzed code segment in accordance with aspects of the subject disclosure. System 300 can include metaphor generation component (MGC) 310 that can access code segment 302. MGC 310 can further comprise metaphor engine component (MEC) 320. MEC 320 can decompose code segment 302 and determine metaphoric elements that can comprise an initial metaphor framework corresponding to the elements of code segment 302.

MGC 310 can further comprise, metaphor analysis component (MAC) 330. MAC 330 can perform a preliminary analysis of the initial metaphor framework determined by MEC 320. Analysis of the initial metaphor framework in view of code segment 302 can result in an intermediate metaphor that can better define aspects of the intermediate metaphor, e.g., variable scope, etc.

Moreover, MGC 310 can also comprise metaphor dependency component (MDC) 340. MDC 340 can determine dependencies of the intermediate metaphor and update, based on said dependencies, the intermediate metaphor as part of generating a metaphor representative of code segment 302.

MGC 310 can additionally comprise metaphor fuzzing component (MFC) 350. MFC 350 can access a metaphor representative of code segment 302, e.g., a metaphor generated via MEC 320, MAC 330, and MDC 340, and can determine and facilitate access to fuzzed code segment 306. Fuzzed code segment 306 can be based on mutations applied to the metaphor for code segment 302, e.g., code segment 302 can be received, a metaphor can be developed for it, the metaphor can be mutated, and fuzzed code segment 306 can be determined based on the mutated metaphor. Further, metaphor information 304 can be accessed via MGC 310.

Language fuzzing by MFC 350, e.g., mutation of the metaphor can be associated with the following list of example mutations. It will be noted that this list of example mutations is not exhaustive and numerous other mutations of the metaphor are conceived and considered within the scope of the subject disclosure, although they are not enumerated herein for clarity and brevity. Whereas any elements of a metaphor can be modified, the following example mutations are presented:

1. Fuzz constant values, such as, numbers and strings, e.g., "var I=42;" 42 is a constant and can be fuzzed, "var str='hello';", hello is a constant and can be fuzzed, etc.
2. Fuzz names of variables
3. Fuzz concepts in language:
    a. Dictionary (key, value storage)
        i. Add very large number of elements in attempt to corrupt an internal state
        ii. Add duplicate key values
        iii. Access key/value store using unusual indexers
        iv. Unicode collisions
    b. List of arguments to a function
        i. Make list very large, e.g., F(arg1, arg2); →F(arg1, arg2, arg2, arg2, arg2, arg2, arg2, arg2 . . . );
        ii. Switch order of arguments, e.g., F(arg1, arg2); →F(arg2, arg1);
        iii. Make list smaller
    c. Statements
        i. Re order statements
        ii. Remove statements
    d. Expressions
        i. Expand expression to contain large number of operands, e.g., (8*8*8*8*8*8*8*8* . . . ")
4. . . .

In order to more fully appreciate the transformation from code segment 302 to initial metaphor framework, then to intermediate metaphor, then to metaphor, then to an output code segment, which can be fuzzed code segment 306 where the metaphor is mutated/fuzzed, another non-limiting example is provided, without mutation of the metaphor, to illustrate the several transitions between code segment 302 and an output code segment, as follows:

Example Code Segment:

```
{{
    var x= [1,2,3,4,5];
    for(var i in x)
    {
        var result=print (i);
    }
}
```

Initial Metaphor Framework:

```
{
    Sequence : [
    {
        Metaphors : [
        {
            Sequence : [
            {
                Metaphors : [
                {
                    CreateVariableInitialized : [
                    {
                        Var : [
```

```
                    {
                        Data : "x",
                        Meta : "var"
                    }
                ]
            },
            {
                ArrayLiteral : [
                    {
                        Literals : [
                            {
                                Integer : [
                                    {
                                        Data : "1"
                                    }
                                ]
                            },
                            {
                                Integer : [
                                    {
                                        Data : "2"
                                    }
                                ]
                            },
                            {
                                Integer : [
                                    {
                                        Data : "3"
                                    }
                                ]
                            },
                            {
                                Integer : [
                                    {
                                        Data : "4"
                                    }
                                ]
                            },
                            {
                                Integer : [
                                    {
                                        Data : "5"
                                    }
                                ]
                            }
                        ]
                    }
                ]
            }
        ]
    },
    {
        DefiniteLoopEnumeration : [
            {
                Var : [
                    {
                        Data : "x",
                        Meta : "ToBeDetermined"
                    }
                ]
            },
            {
                Var : [
                    {
                        Data : "i",
                        Meta : "var"
                    }
                ]
            },
            {
                Sequence : [
                    {
                        Metaphors : [
                            {
                                CreateVariableInitialized : [
                                    {
                                        Var : [
                                            {
                                                Data : "result",
```

-continued

```
                    Meta : "var"
                  }
                ]
              },
              {
                FunctionCall : [
                  {
                    Var : [
                      {
                        Data : "print",
                        Meta : "ToBeDetermined"
                      }
                    ]
                  },
                  {
                    Exprs : [
                      {
                        Var : [
                          {
                            Data : "i",
                            Meta : "ToBeDetermined"
                          }
                      ]}]}]}]}]}]}]}]}
```

Intermediate Metaphor:

```
{
Sequence : [
    {
    Metaphors : [
        {
        Sequence : [
            {
            Metaphors : [
                {
                CreateArrayInitialized : [
                    {
                    Var : [
                        {
                        Data : "x",
                        Meta : "local"
                        }
                    ]
                    },
                    {
                    ArrayLiteral : [
                        {
                        Literals : [
                            {
                            Integer : [
                                {
                                    Data : "1"
                                }
                            ]
                            },
                            {
                            Integer : [
                                {
                                Data : "2"
                                }
                            ]
                            },
                            {
                            Integer : [
                                {
                                Data : "3"
                                }
                            ]
                            },
                            {
                            Integer : [
                                {
                                Data : "4"
                                }
                            ]
                            },
```

-continued

```
                    {
                        Integer : [
                            {
                                Data : "5"
                            }
                        ]
                    }
                ]
            }
        ]
    },
    {
        DefiniteLoopEnumeration : [
            {
                Var : [
                    {
                        Data : "x",
                        Meta : "local"
                    }
                ]
            },
            {
                Var : [
                    {
                        Data : "i",
                        Meta : "local"
                    }
                ]
            },
            {
                Sequence : [
                    {
                        Metaphors : [
                            {
                                CreateVariableInitialized : [
                                    {
                                        Var : [
                                            {
                                                Data : "result",
                                                Meta : "local"
                                            }
                                        ]
                                    },
                                    {
                                        FunctionCall : [
                                            {
                                                Var : [
                                                    {
                                                        Data : "print",
                                                        Meta : "global"
                                                    }
                                                ]
                                            },
                                            {
                                                Exprs : [
                                                    {
                                                        Var : [
                                                            {
                                                                Data : "i",
                                                                Meta : "local"
                                                            }
                                                        ]
                                                    }
]}]}]}]}]}]}]}]}]}
```

Metaphor (with Dependencies):

```
{
    Sequence: [
        {
            Metaphors: [
                {
                    CreateVariable: [
                        {
                            Var: [
                                { Data: "print", Meta: "global"
}]}]}
```

-continued

```
                        }]
                }, {
                    Sequence: [
                        {
                            Metaphors: [
                                {
                                    Sequence: [
                                        {
                                            Metaphors: [
                                                {
CreateArrayInitialized: [
                                                    Var:
[ { Data: "x", Meta: "local" } ]
                                                }, {
ArrayLiteral: [
                                                    {
Literals: [
{
Integer: [{ Data: "1" }]
}, {
Integer: [{ Data: "2" }]
}, {
Integer: [{ Data: "3" }]
}, {
Integer: [{ Data: "4" }]
}, {
Integer: [{ Data: "5" }]
}]
}]

DefiniteLoopEnumeration: [
                                                }]
                                            }, {
[{ Data: "x", Meta: "local" }]
                                                {
                                                    Var:
                                                }, {
[{ Data: "i", Meta: "local" }]
                                                    Var:
Sequence: [
                                                }, {
Metaphors: [
                                                    {
{
CreateVariableInitialized: [
{
Var: [{ Data: "result", Meta: "local" }]
}, {
FunctionCall: [
{
Var: [{ Data: "print", Meta: "global" }]
}, {
Exprs: [
{
Var: [{ Data: "i", Meta: "local" }]
}]
}]
}]
}]
}]
                                                }]
                                            }]
                                        }]
                                    }]
                                }]
                            }]
                        }]
                }
```

Output Code Segment (Fuzzed Code Segment 306 where Metaphor is Mutated):

```
        var print;
        {
            var x=[1,2,3,4,5];
            for (var i in x)
```

-continued

```
            {
                var result=print(i);
            }
        }
```

In this additional non-limiting example, the metaphor can be mutated to generate fuzzed code segment 306. Mutations can be based on determined logical perturbations to the elements of the metaphor and can therefore represent mutations that could be applied to the input code segment. However, the determined logical perturbations can be written for the language used for the metaphor, in the above example JSON, thus allowing the mutation to be used on the metaphor regardless of the language used on the input code segment, e.g., because the code segment is translated from the input language into the metaphor language, the mutator only needs to be written to mutate the metaphor. This allows the same mutator to be used for a plurality of input code segment languages.

As disclosed, mutations of the metaphor can be based on determined logical perturbations to the elements of the metaphor and can be representative of mutations to the input code segment. Numerous examples of mutators for the current example are readily presented, such as, perturbation on the "Literals" can change the "Integer" type to a string, a double, etc., perturbation to the "print" FunctionCall can change the FunctionCall to write to memory locations of interest, etc., perturbation of the "for" loop can duplicate regress the "for" loop, etc. It will be noted that any element of the code segment represented in the metaphor can be fuzzed by applying a mutator to the metaphor. Clearly the examples presented herein are non-limiting examples only in view of the numerous examples that could be presented but are not for the sake of brevity and clarity. It will further be noted that mutators can be preserved after they are created. As such, libraries of mutators can be created, stored, and accessed as part of language fuzzing code segments.

Figure 4:
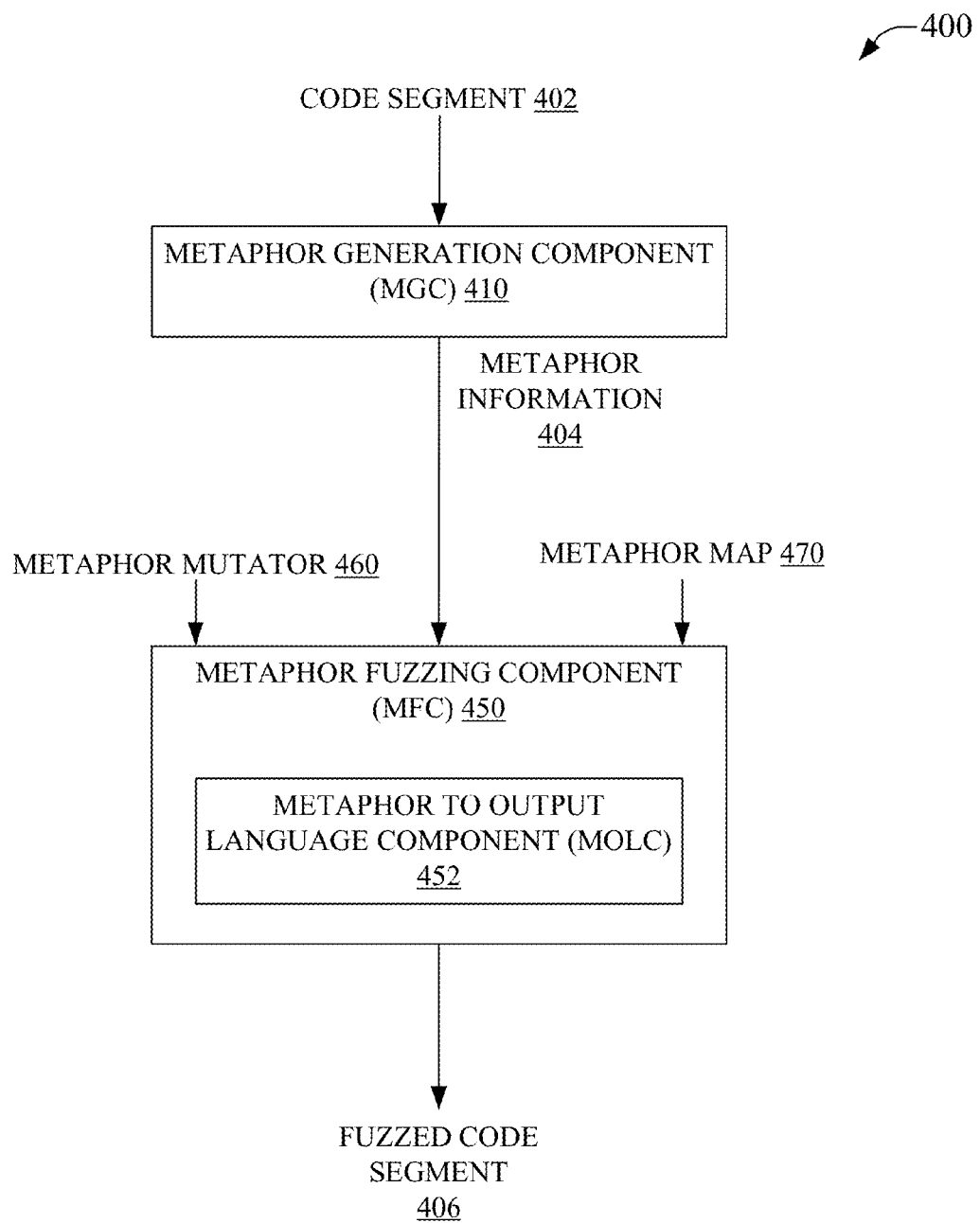
FIG. 4 illustrates a system that facilitates code segment analysis by facilitating access to a fuzzed code segment in a selected output language in accordance with aspects of the subject disclosure.

FIG. 4 illustrates a system 400 that facilitates code segment analysis by facilitating access to a fuzzed code segment in a selected output language in accordance with aspects of the subject disclosure. System 400 can include metaphor generation component (MGC) 410. MGC 410 can receive code segment 402. MGC 410 can further facilitate access to metaphor information 404. Metaphor information 404 can comprise a metaphor corresponding to code segment 402, as disclosed in the subject disclosure. Also as disclosed herein code segment 402 can be in a different computer language than a metaphor of code segment 402 related to metaphor information 404.

System 400 can further comprise metaphor fuzzing component (MFC) 450. MFC 450 can receive metaphor information 404. In some embodiments, MFC 450 can receive metaphor mutator 460. Metaphor mutator 460 can be based on determined logical perturbations to the elements of the metaphor. As such, metaphor mutator 460 can facilitate mutation of a metaphor comprised in metaphor information 404. Metaphor mutator can facilitate mutation of an element of the metaphor as a surrogate for mutating a corresponding element of code segment 402. In some embodiments, MFC 450 can receive metaphor map 470. Metaphor map 470 can facilitate linking between metaphor elements, for example, resulting from decomposing code segment 402, during mutation of a metaphor, etc. Linking between metaphor elements, e.g., those derived from an AST, etc., preserves the functionality of an output code segment based on the metaphor or mutated metaphor. In an aspect, lack of a metaphor map can be associated with poor linking between metaphor elements and, in some circumstances, can result in an output code segment that is not syntactically viable due to translation errors. In an aspect, metaphor map 470 can provide rules or logic to linking generic metaphor elements together in a metaphor and preserving linkages between metaphor elements during mutation, e.g., facilitating metaphor generation and mutation syntax in an intelligent manner. In some embodiments, metaphor map 470 can be based on the output code segment language to better ensure that the output code segment will be syntactically viable for further analysis. This can further facilitate targeting output code segment language issues to direct mutation of a metaphor to address said issues.

MFC 450 can mutate a metaphor related to metaphor information 404 based on metaphor mutator 460 and in view of metaphor map 470. The mutated metaphor can be a surrogate for mutation of code segment 402. MFC 450 can further comprise metaphor to output language component (MOLC) 452. MOLC 452 can facilitate composing the metaphor or mutated metaphor in a designated output language. As disclosed elsewhere herein, the output language can be different from the language code segment 402 is received in, however, for clarity and brevity, the output language will be treated to be the same as the input language at code segment 402 in further discussion. MOLC 452 facilitates generation of an output code segment. Where the metaphor has been mutated by MFC 450, the output code segment can be fuzzed code segment 406. MFC can facilitate access to fuzzed code segment 406, wherein fuzzed code segment 406 can be based on a metaphor corresponding to code segment 402.

Figure 5:
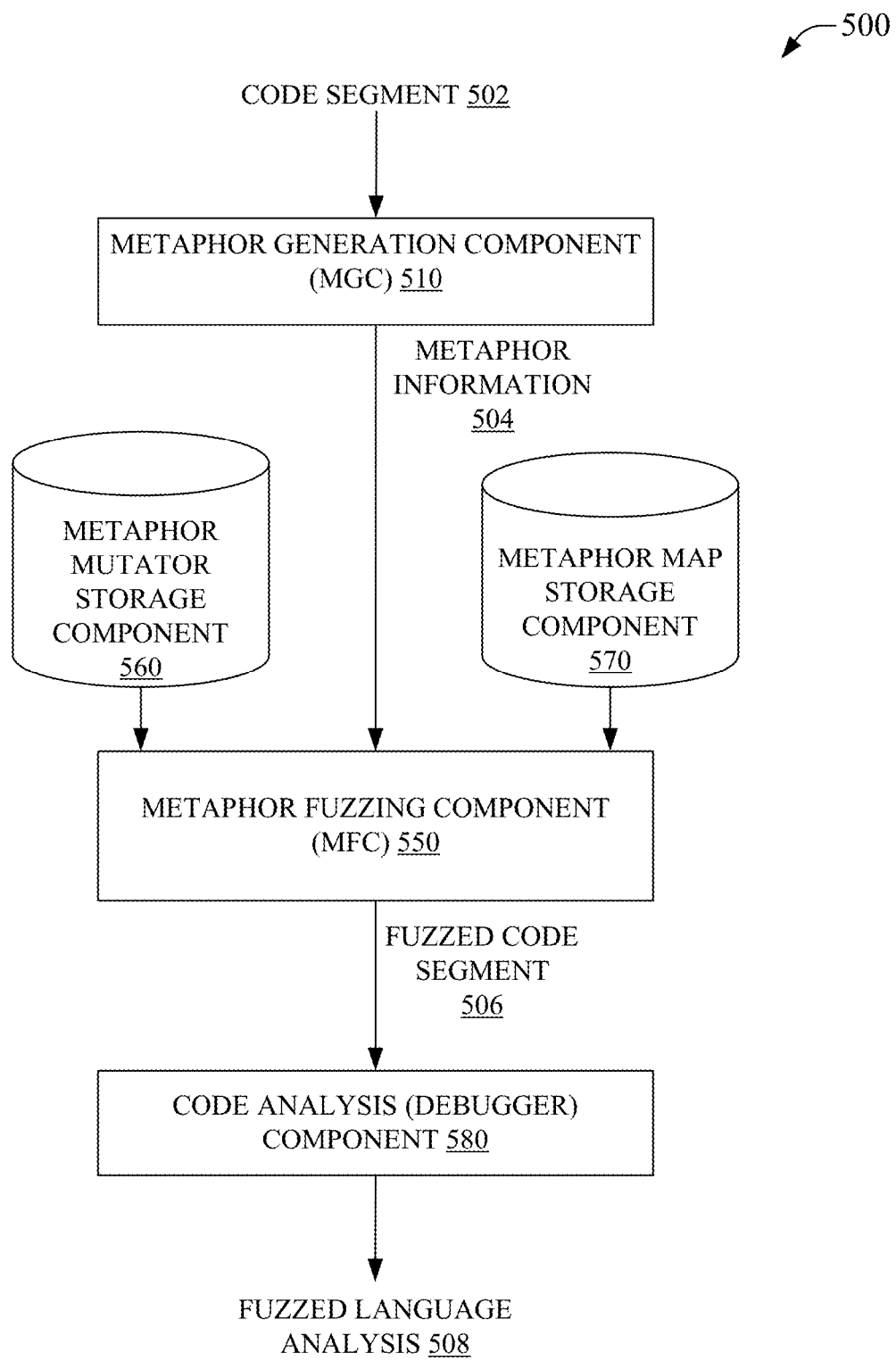
FIG. 5 illustrates a system that facilitates code segment analysis by facilitating access to a fuzzed language analysis based on a fuzzed code segment in accordance with aspects of the subject disclosure.

FIG. 5 is a depiction of a system 500 that facilitates code segment analysis by facilitating access to a fuzzed language analysis based on a fuzzed code segment in accordance with aspects of the subject disclosure. System 500 can include metaphor generation component (MGC) 510. MGC 510 can receive code segment 502. MGC 510 can further facilitate access to metaphor information 504. Metaphor information 504 can comprise a metaphor corresponding to code segment 502, as disclosed in the subject disclosure.

System 500 can further comprise metaphor fuzzing component (MFC) 550. MFC 550 can receive metaphor information 504. In an embodiment, MFC 550 can receive a metaphor mutator from a metaphor mutator storage component 560. Metaphor mutator storage component 560 can store mutators based on determined logical perturbations to the elements of a metaphor, e.g., a library of mutators can be stored on metaphor mutator storage component 560. As such, metaphor mutator storage component 560 can facilitate mutation of a metaphor comprised in metaphor information 504 by facilitating access to one or more mutators. In an embodiment, MFC 550 can receive a metaphor map from metaphor map storage component 570. Metaphor map storage component 570 can facilitate access to a metaphor map that can facilitate linking between metaphor elements. Linking between metaphor elements can preserve the functionality of an output code segment based on the metaphor or mutated metaphor. In an aspect, lack of a metaphor map can be associated with poor linking between metaphor elements and, in some circumstances, can result in an output code segment that is not syntactically viable due to translation errors. In an aspect, metaphor map storage component 570 can provide access to rules or logic for linking generic metaphor elements together in a metaphor and preserving linkages between metaphor elements during mutation. MFC 550 can mutate a metaphor related to metaphor information 504 based on a metaphor mutator received from metaphor mutator storage component 560 and further based on a metaphor map received from metaphor map storage component 570. The mutated metaphor can be a surrogate for mutation of code segment 502.

System 500 can further comprise code analysis (debugger) component 580. Debugger component 580 can receive fuzzed code segment 506 from MFC 550. Debugger component 580 can facilitate analysis of fuzzed code segment 506 to determine a deviation in performance from code segment 502. These deviations can be correlated to mutations of the metaphor representing code segment 502. Whereas the metaphor corresponds to code segment 502, performance deviations can be tracked back to elements of code segment 502 via the corresponding mutated element of the metaphor. Further, the ability to automate aspects of mutation and analysis can facilitate focused study of particular elements of code segment 502. Debugger component 580 can facilitate access to analysis information, illustrated as fuzzed language analysis 508.

Figure 6:
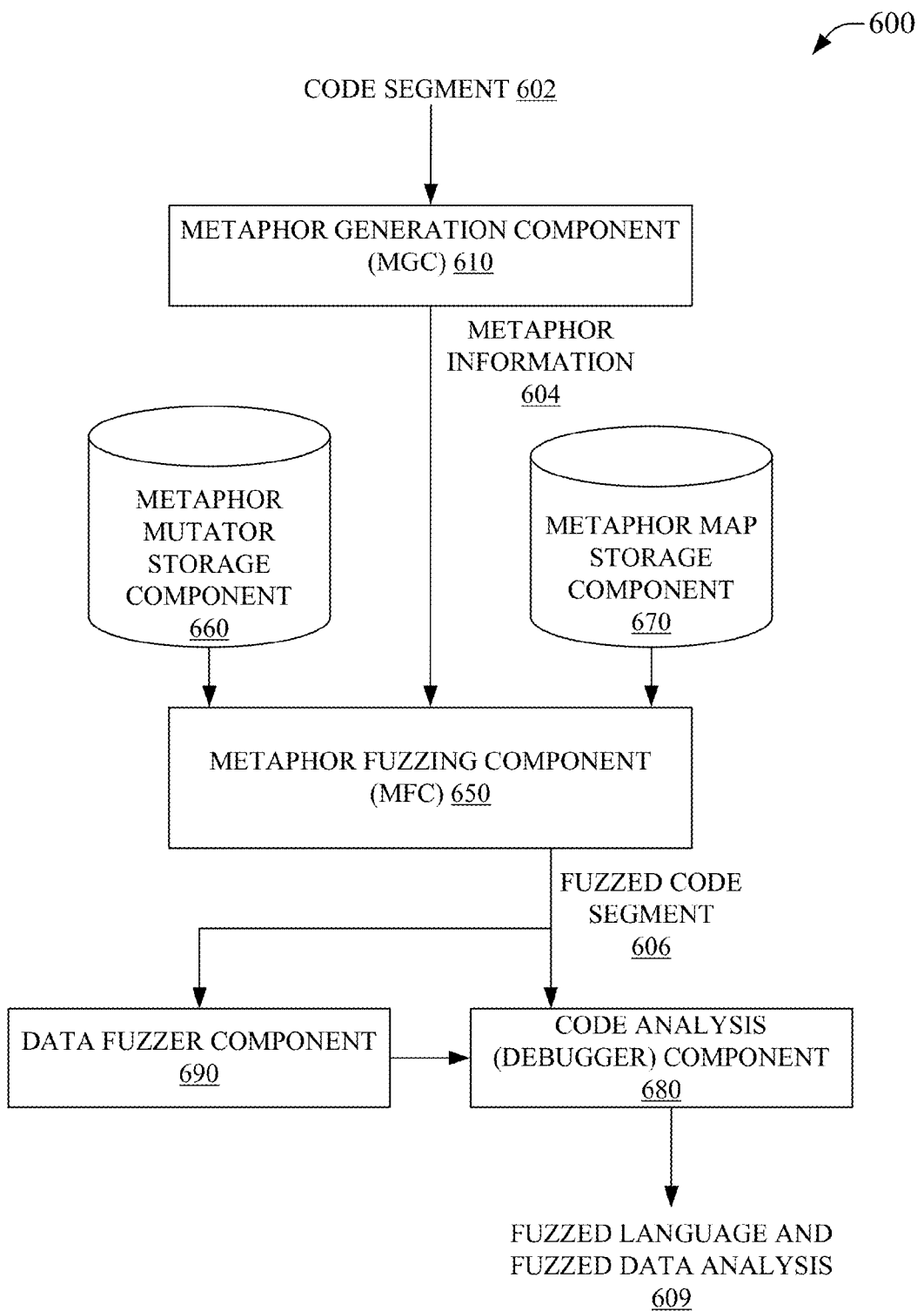
FIG. 6 illustrates a system that facilitates code segment analysis by facilitating access to a fuzzed language and fuzzed data analysis based on a fuzzed code segment in accordance with aspects of the subject disclosure.

FIG. 6 is a depiction of a system 600 that facilitates code segment analysis by facilitating access to a fuzzed language and fuzzed data analysis based on a fuzzed code segment in accordance with aspects of the subject disclosure. System 600 can include metaphor generation component (MGC) 610. MGC 610 can receive code segment 602. MGC 610 can further facilitate access to metaphor information 604. Metaphor information 604 can comprise a metaphor corresponding to code segment 602, as disclosed in the subject disclosure.

System 600 can further comprise metaphor fuzzing component (MFC) 650. MFC 650 can receive metaphor information 604. In an embodiment, MFC 650 can receive a metaphor mutator from a metaphor mutator storage component 660. Metaphor mutator storage component 660 can store mutators based on determined logical perturbations to the elements of a metaphor, e.g., a library of mutators can be stored on metaphor mutator storage component 660. As such, metaphor mutator storage component 660 can facilitate mutation of a metaphor comprised in metaphor information 604 by facilitating access to one or more mutators. In an embodiment, MFC 650 can receive a metaphor map from metaphor map storage component 670. Metaphor map storage component 670 can facilitate access to a metaphor map that can facilitate linking between metaphor elements. Linking between metaphor elements can preserve the functionality of an output code segment based on the metaphor or mutated metaphor. MFC 650 can mutate a metaphor related to metaphor information 604 based on a metaphor mutator received from metaphor mutator storage component 660 and further based on a metaphor map received from metaphor map storage component 670. The mutated metaphor can be a surrogate for mutation of code segment 602.

System 600 can further comprise code analysis (debugger) component 680. Debugger component 680 can receive fuzzed code segment 606 from MFC 650. Debugger component 680 can facilitate analysis of fuzzed code segment 606 to determine a deviation in performance from code segment 602. These deviations can be correlated to mutations of the metaphor representing code segment 602. Whereas the metaphor corresponds to code segment 602, performance deviations can be tracked back to elements of code segment 602 via the corresponding mutated element of the metaphor. Further, the ability to automate aspects of mutation and analysis can facilitate focused study of particular elements of code segment 602.

System 600 can further comprise data fuzzer component 690 that can receive fuzzed code segment 606. Data fuzzer component 690 can provide fuzzing of input data value that are received by fuzzed code segment 606 in execution. As such, while debugger component 680 can be generally related to language fuzzing, data fuzzer component 690 can be generally related to data fuzzing for instances of mutated code segments, e.g., fuzzed code segment 606. As is noted elsewhere herein, strictly speaking, data fuzzing can be comprised in fuzzing of the metaphor, however, system 600 illustrates that data fuzzing can also be performed separate from language fuzzing without deviating from the scope of the disclosed subject matter. This can be convenient when a data fuzzer is available to run in conjunction with the disclosed language fuzzing subject matter in than it can reduce a need to internally implement data fuzzing as part of the language fuzzing system. Data fuzzer component 690 can pass data fuzzing results through debugger component 680 such that they can be included in fuzzed language and fuzzed data analysis 609.

In view of the example system(s) described above, example method(s) that can be implemented in accordance with the disclosed subject matter can be better appreciated with reference to flowcharts in FIG. 7-FIG. 10. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 7:
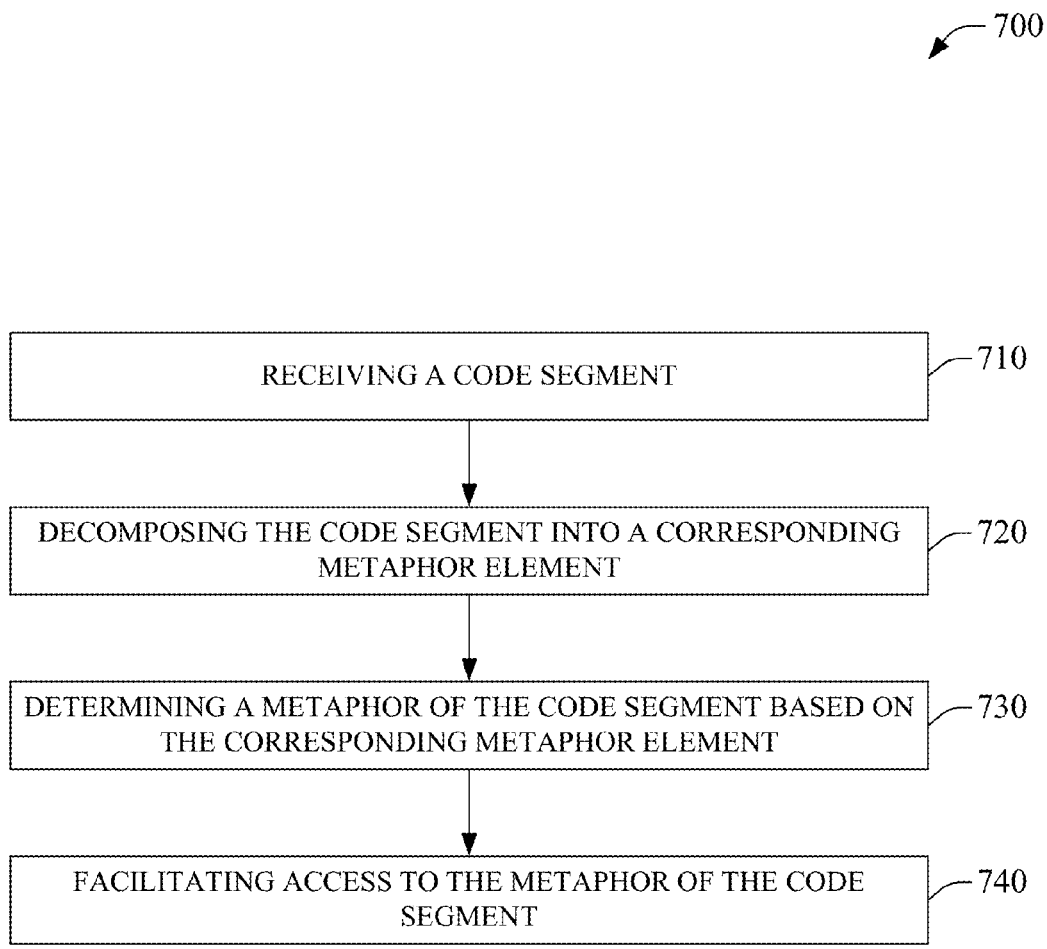
FIG. 7 illustrates a method for facilitating code segment analysis by determining a metaphoric representation of the code segment in accordance with aspects of the subject disclosure.

FIG. 7 illustrates aspects of method 700 facilitating code segment analysis by determining a metaphoric representation of the code segment in accordance with aspects of the subject disclosure. At 710, a method 700 can receive a code segment. A code segment can be all or part of a program or routine. At 720, the code segment can be decomposed into a corresponding metaphor element. The metaphor element can be representative of an aspect of the code segment. Based on the corresponding metaphor element, at 730, a metaphor of the code segment can be determined. In some embodiments, the metaphor can be in a different computer language than the code segment. At 740, method 700 can comprise facilitating access to the metaphor of the code segment. At this point method 700 can end.

Method 700 generates a metaphor of the code segment specifically with regard to software code testing by fuzzing or mutation of the metaphor as a proxy for the cede segment. Method 700 illustrates that a metaphor can be created from a plurality of input languages, such that mutation of the metaphor can be written in fewer languages than would otherwise be needed to mutate the code segment in each of the plurality of languages. In an aspect, the language employed for the metaphor and mutations can act as a root language between an input code segment language and an output code segment language as disclosed elsewhere herein.

Figure 8:
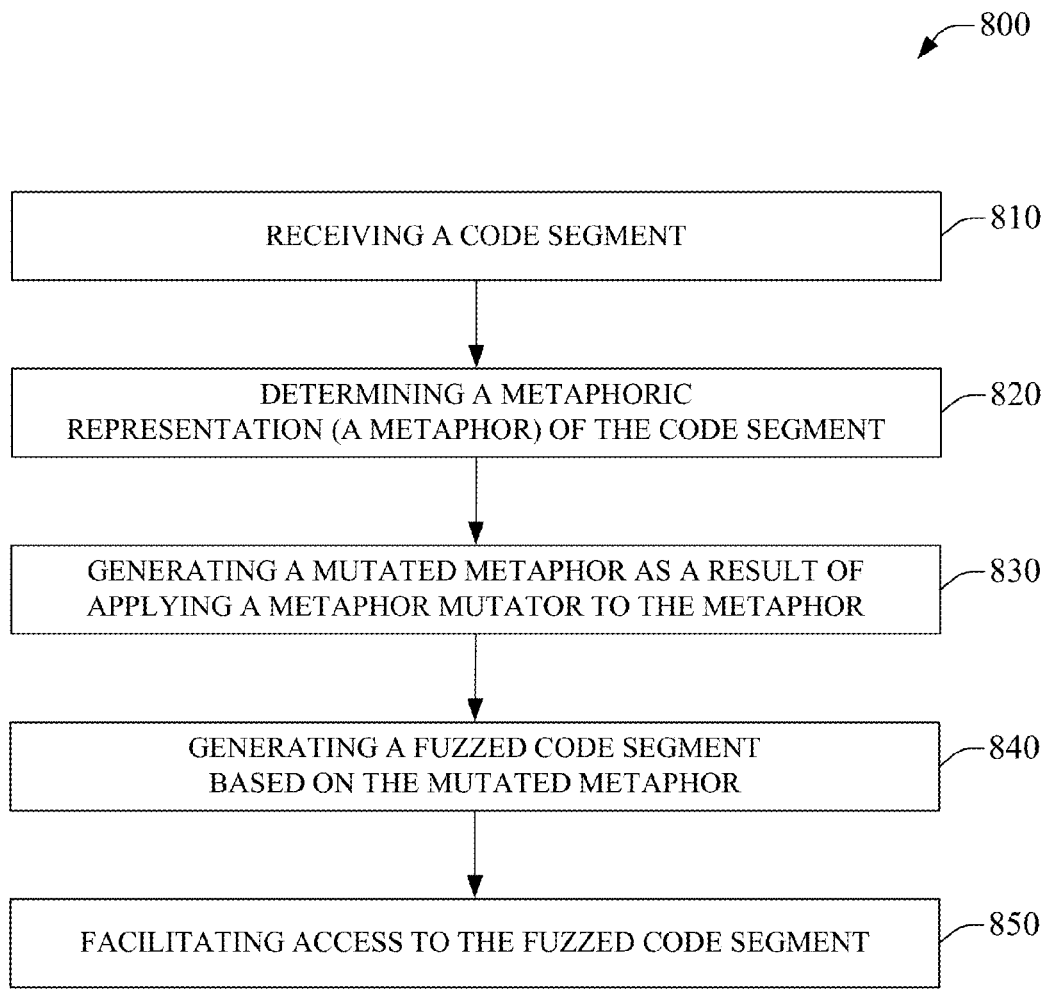
FIG. 8 illustrates a method for facilitating code segment analysis by generating a fuzzed code segment based on a mutated metaphor of the code segment in accordance with aspects of the subject disclosure.

FIG. 8 illustrates aspects of method 800 facilitating code segment analysis by generating a fuzzed code segment based on a mutated metaphor of the code segment in accordance with aspects of the subject disclosure. At 810, method 800 can include receiving a code segment. At 820, a metaphoric representation of the code segment can be determined, e.g., a metaphor of the code. The metaphor can be in a different language than the code segment. Further the metaphor can facilitate mutation as a surrogate for the code segment as disclosed herein.

At 830, a mutated metaphor can be generated as a result of applying a metaphor mutator to the metaphor determined at 820. Mutations can be based on determined logical perturbations to the elements of the metaphor. Mutators can be created to perturb any aspect of the metaphoric representation of the code segment. Mutators can therefore facilitate fuzzing of the syntactical constructs associated with the input code segment, through the metaphor proxy, rather than being limited to fuzzing of data values passed into executing code. Mutators can be stored, e.g., in a library, etc., to facilitate language fuzzing of a metaphor. This can enable the reuse of previously developed mutators to metaphors representing new software, software written in new languages, etc., for example, where a mutator for perturbing a "write to disk" element of a metaphor has been created and stored, this mutator can be applied to the metaphorical representation of a "write to disk" code segment written in BASIC™, PEARL™, JAVA™, C++™, or at some time in the future in a language that is not yet in existence. This reuse of a mutator can be efficient in contrast to writing a "write to disk" in BASIC™, a "write to disk" in PEARL™, a "write to disk" in JAVA™, etc.

At 840, method 800 can generate a fuzzed code segment based on the mutated metaphor of 830. The fuzzed code segment can be in a different language than the mutated metaphor. The fuzzed code segment can, in some embodiments, be in the same language as the code segment from 810. In other embodiments, the fuzzed code segment can be in a different language than the code segment from 810. At 850, access to the fuzzed code segment can be facilitated. At this point method 800 can end. The fuzzed code segment can be useful in evaluating differences in performance against the code segment of 810. These differences can be associated with the mutations applied to the metaphoric representation of the code segment. As such, a code segment can be received, a metaphor can be generated and mutated, and a fuzzed code segment can be based on the mutated metaphor to facilitate correlating mutations with the effects of the mutations on the performance of the fuzzed code segment in contrast to the input code segment via the metaphor proxy for the input code segment.

Figure 9:
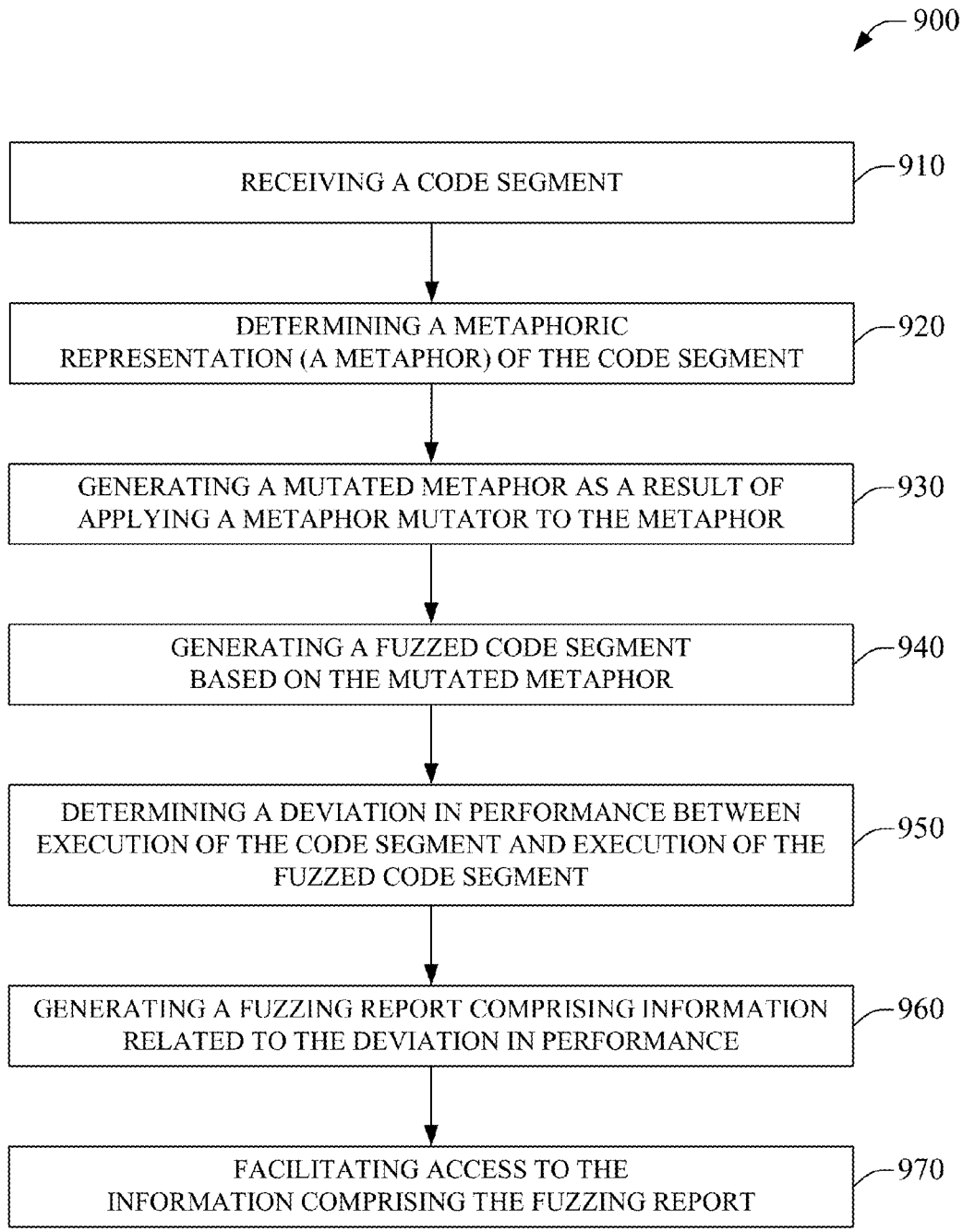
FIG. 9 illustrates a method for facilitating code segment analysis by generating a fuzzing report related to a mutated metaphoric representation of the code segment in accordance with aspects of the subject disclosure.

FIG. 9 illustrates aspects of method 900 facilitating code segment analysis by generating a fuzzing report related to a mutated metaphoric representation of the code segment in accordance with aspects of the subject disclosure. At 910, a code segment can be received. At 920, a metaphoric representation, e.g., a metaphor of the code can be determined. At 930, a mutated metaphor can be generated as a result of applying a metaphor mutator to the metaphor. At 940, a fuzzed code segment can be generated based on the mutated metaphor.

At 950, the fuzzed code segment from 940 can be tested to determine a deviation in performance between the execution of the code segment from 910 and the execution of the fuzzed code segment from 940. Mutation of the metaphor can be the basis for observed deviations in performance. Therefore, the mutation can be extrapolated to similar performance deviations where the code segment is similarly mutated. As an example, where a code segment includes a "write to file" based on a local filename variable determined at runtime and accessed just before the "write to file" occurs, a mutation to the metaphor representation of the code segment can move the accessing the local filename variable to an earlier time in the runtime environment so that it does not occur just before the "write to file" in the mutated metaphor. The mutated metaphor can then be the bases for a fuzzed code segment that can be tested to compare performance against the input code segment. Where the input code segment executes as expected, but the fuzzed code segment causes the "write to file" to write values into a different filename, the mutation can be associated with this change in performance. As such, it can be determined that the mutation, as applied to the metaphor, can have a similar effect where applied to the input code segment. This can, for example, allow software developers an opportunity to alter the code segment to protect against possible exploitation of this aspect of the "write to file" element of the code segment.

At 960, method 900 can comprise generating a fuzzing report comprising information related to the deviation in performance, or lack thereof, from 950. At 970, access to the information comprising the fuzzing report can be facilitated by method 900. At this point method 900 can end.

Figure 10:
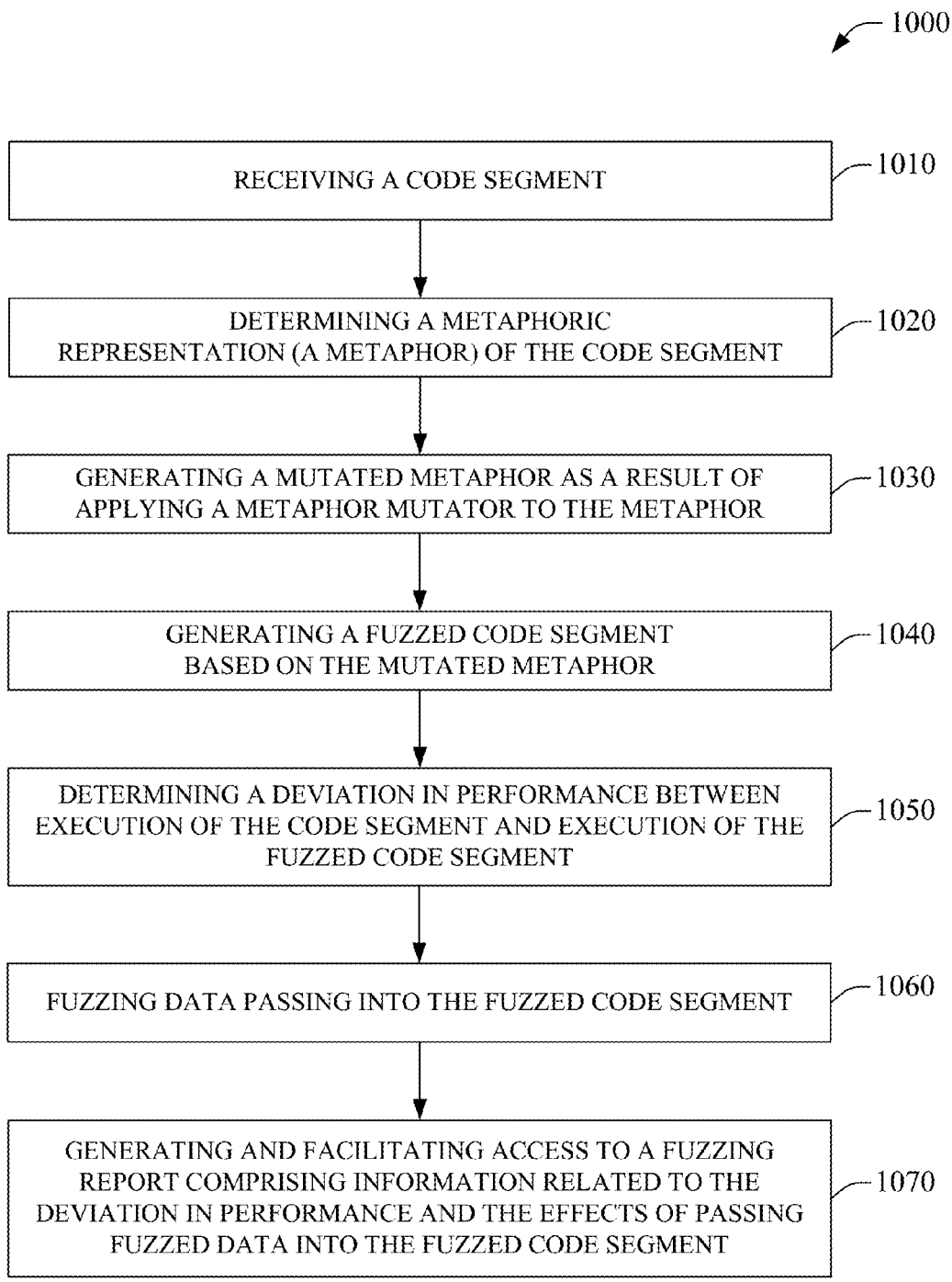
FIG. 10 illustrates a method for facilitating code segment analysis by generating a fuzzing report related to a fuzzed code segment, based on a mutated metaphoric representation of the code segment, and further based on passing fuzzed data into the fuzzed code segment in accordance with aspects of the subject disclosure.

FIG. 10 illustrates aspects of method 1000 facilitating code segment analysis by generating a fuzzing report related to a fuzzed code segment, based on a mutated metaphoric representation of the code segment, and further based on passing fuzzed data into the fuzzed code segment in accordance with aspects of the subject disclosure. At 1010, method 1000 can include receiving a code segment. At 1020, a metaphoric representation, e.g., a metaphor, of the code can be determined. At 1030, a mutated metaphor can be generated as a result of applying a metaphor mutator to the metaphor. At 1040, a fuzzed code segment can be generated based on the mutated metaphor.

At 1050, the fuzzed code segment from 1040 can be tested to determine a deviation in performance between the execution of the code segment from 1010 and the execution of the fuzzed code segment from 1040. Mutation of the metaphor can be the basis for observed deviations in performance. Therefore, the mutation can be extrapolated to similar performance deviations where the code segment is similarly mutated.

At 1060, method 1000 can comprise fuzzing data passed into the fuzzed code segment from 1050. As is noted elsewhere herein, data fuzzing can, in some embodiments, be comprised in fuzzing of the metaphor, however, method 900 illustrates that data fuzzing can also be performed separate from language fuzzing without deviating from the scope of the disclosed subject matter. This can be convenient when a data fuzzer is available to run in conjunction with the features of the disclosed language fuzzing subject matter, in than it can reduce a need to internally implement data fuzzing as part of the language fuzzing system.

At 1070, method 1000 can comprise generating and facilitating access to a fuzzing report comprising information related to the deviation in performance, or lack thereof, from 1050 and the effects of passing fuzzed data into the fuzzed code segment from 1060. At this point method 1000 can end.

Figure 11:
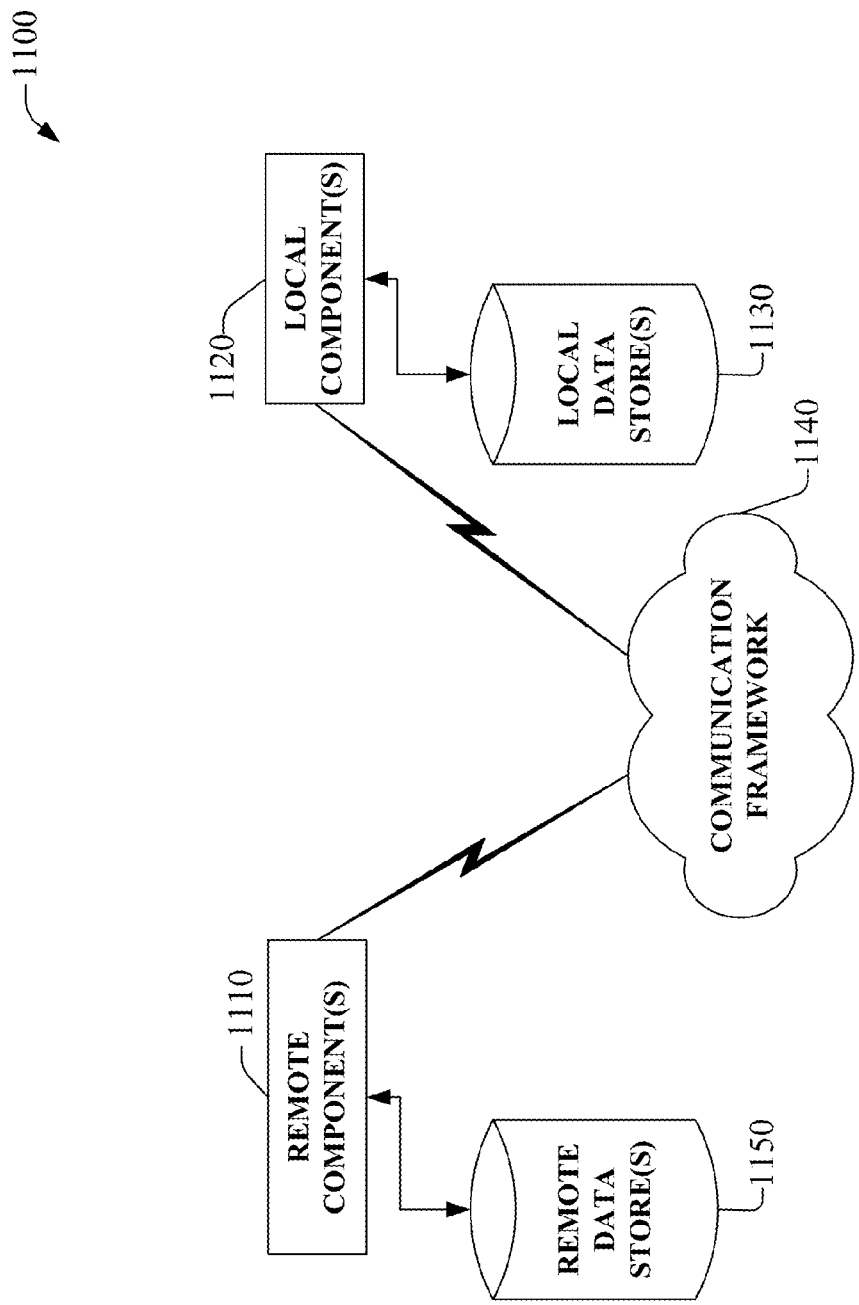
FIG. 11 depicts a schematic block diagram of a sample-computing environment with which the claimed subject matter can interact.

FIG. 11 is a schematic block diagram of a sample-computing environment 1100 with which the claimed subject matter can interact. The system 1100 includes one or more remote component(s) 1110, which, in some embodiments, can include server-side component(s). The remote component(s) 1110 can be hardware and/or software (e.g., threads, processes, computing devices). In some embodiments, remote component(s) 1110 can include MGC 110-610, MFC 450-650, metaphor mutator storage component 560-660, metaphor map storage component 570-670, debugger component 580-680, etc. As an example, remote component(s) 1110 can be a server computer (remote from a software or test engineer's computing device) that has an interface for receiving code segment 102-602 and an interface for returning metaphor information 104-604, fuzzed code segment 406-606, fuzzed language analysis 508, etc., to a target client-side device, such as a software or test engineer's computing device.

The system 1100 also includes one or more local component(s) 1120, which can include client-side component(s). The local component(s) 1120 can be hardware and/or software (e.g., threads, processes, computing devices). In some embodiments, local component(s) 1120 can include MGC 410-610, MFC 450-650, debugger 580-680, etc. As an example, local component(s) 1120 can be a software or test engineer's computing device housing code segment 402 that can sent to remote component(s) 1110 via communications framework 1140.

One possible communication between a remote component(s) 1110 and a local component(s) 1120 can be in the form of a data packet adapted to be transmitted between two or more computer processes. As an example, code segment 102-602 can be communicated between a code developer's computing system, e.g., local component 1120, and MGC 110-610, e.g., a remote component 1110. As another example, where metaphor information 104 is determined locally at a development corporation, it can be communicated from a development corporation server, e.g., local component 1120, to MFC 450-650, residing on a testing server located at a software testing company, e.g., remote component 1110. The system 1100 includes a communication framework 1140 that can be employed to facilitate communications between the remote component(s) 1110 and the local component(s) 1120. The remote component(s) 1110 are operably connected to one or more remote data store(s) 1150 that can be employed to store information on the remote component(s) 1110 side of communication framework 1140. Similarly, the local component(s) 1120 are operably connected to one or more local data store(s) 1130 that can be employed to store information on the to the local component(s) 1120 side of communication framework 1140.

Figure 12:
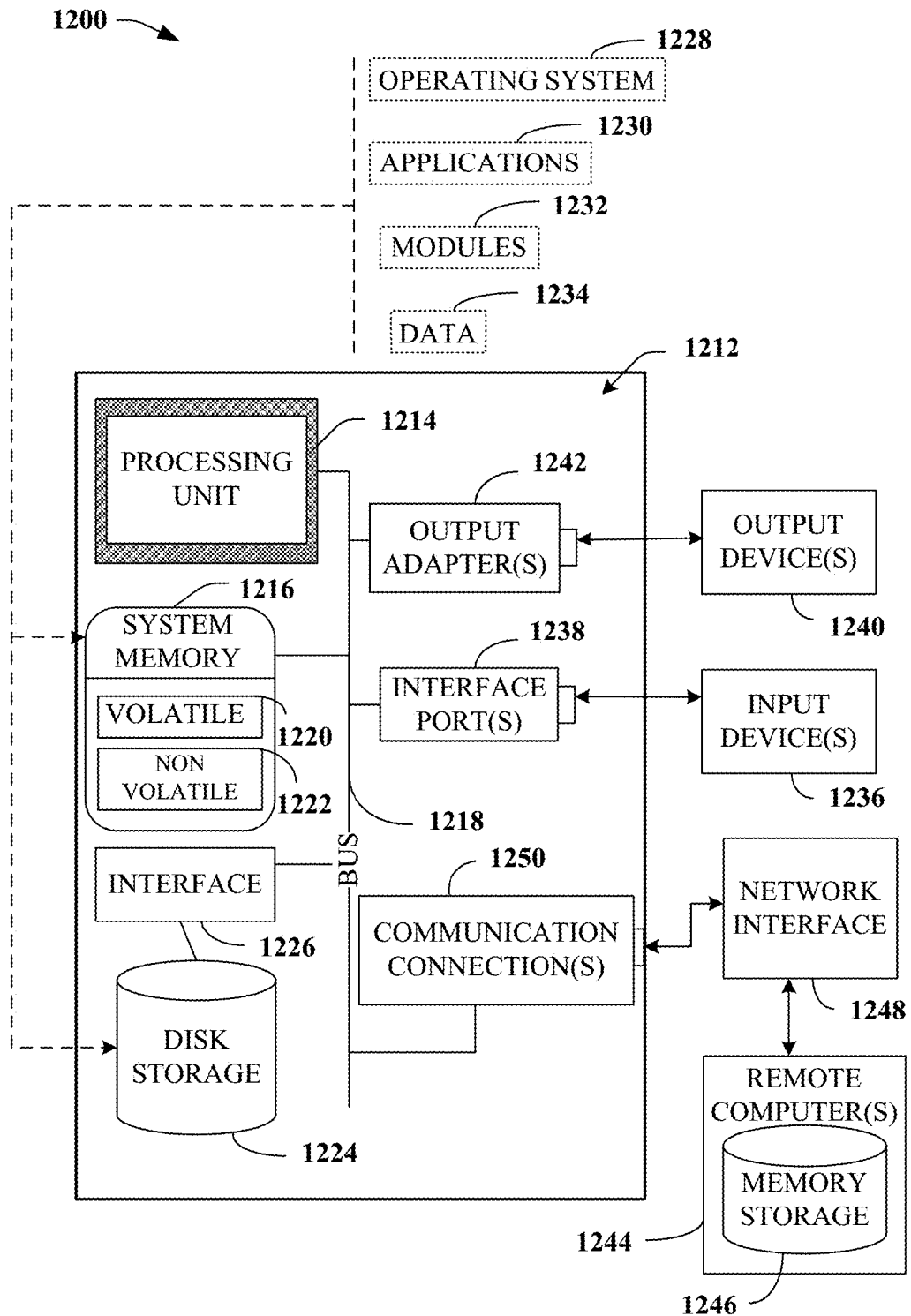
FIG. 12 illustrates a block diagram of a computing system operable to execute the disclosed systems and methods in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be employed, for example, by a developer to test code, e.g., via metaphor generation component 110-610, etc., includes a processing unit 1214, a system memory 1216, and a system bus 1218. Computer 1212 can also comprise, for example, metaphor fuzzing component 450-650, debugger component 580-68-, etc. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1194), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, a developer can submit code segment 102 to metaphor generation component 110, etc., by way of a user interface embodied in a touch sensitive display panel, keyboard, mouse, etc., allowing a developer to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-topoint links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
receiving a first code segment in a first computer language;
receiving a second code segment in a second computer language;
decomposing the first and second code segments into constituent code elements;
determining a metaphoric element corresponding to a constituent code element of the constituent code elements;
determining metaphor data representing a metaphor, in a third computer language, corresponding to the constituent code element based on the metaphoric element;
allowing access to the metaphor data to facilitate an operation related to the metaphor, and
generating a third code segment, in a fourth language, based on a modification of the metaphor data as a result of the operation related to the metaphor.

2. The system of claim 1, wherein the third computer language is different from the first or second computer language.

3. The system of claim 1, wherein the first computer language is different from the second computer language.

4. The system of claim 1, wherein the fourth computer language is different from the third computer language.

5. The system of claim 1, wherein the operation related to the metaphor comprises applying a mutator to the metaphor data representing the metaphor.

6. The system of claim 5, wherein the mutator is part of a mutator library stored on a storage device.

7. The system of claim 1, wherein determining the metaphor data comprises determining an initial metaphor framework corresponding to metaphoric elements comprising the metaphoric element.

8. The system of claim 7, wherein the determining the metaphor data further comprises determining an intermediate metaphor, comprising a defined relationship, based on the initial metaphor framework, and wherein the defined relationship replaces a relationship that was not defined.

9. The system of claim 1, wherein the third code segment is employed in determining a deviation in performance between the third code segment in execution and the first or second code segment in execution.

10. The system of claim 1, wherein the third code segment is executable code or is compliable into executable code.

11. The system of claim 1, further comprising:
in response to applying a mutator to the metaphor data representing the metaphor, determining a mutation deviation in performance between execution of the third code segment and execution of the first or second code segment;
in response to passing fuzzed data to the third code segment during execution of the third code segment, determining a fuzz deviation in performance between execution of the third code segment and execution of the first or second code segment; and
enabling access to information related to the mutation deviation in performance and the fuzz deviation in performance.

12. The system of claim 11, wherein the mutation deviation in performance or the fuzz deviation in performance can comprise a fault, a crash, or an unexpected behavior.

13. A method, comprising:
receiving, by a system comprising a processor, a first code segment in a first language and a second code segment in a second language;
determining by the system, in response to identifying features of the code segments, a metaphoric element corresponding to a feature of the first or second code segment;
generating, by the system, a metaphor, in a third language, representing the feature of the first or second code segment based on the metaphoric element;
generating, by the system, a third code segment in a fourth language in response to mutating the metaphor, and
facilitating, by the system, access to the third code segment.

14. The method of claim 13, wherein the first language and second language are different languages.

15. The method of claim 13, wherein the third language is different from the first and second languages.

16. The method of claim 13, wherein the generating the third code segment comprises generating executable file or code that compiles to an executable file.

17. The method of claim 13, wherein the generating the third code segment is in response to mutating the metaphor by applying a mutator, received from a data store located remote form the system, to the metaphoric element.

18. The method of claim 17, further comprising:
determining, by the system, a deviation in performance between execution of the third code segment and execution of the first or second code segment; and
facilitating, by the system, access to information related to the deviation in performance.

19. A non-transitory computer readable medium having instructions stored thereon that, in response to execution, cause a system comprising a processor to perform operations, comprising:
determining, in response to decomposing a first code segment in a first language and second code segment in a second language into constituent code elements, a metaphoric element corresponding to a constituent code element of the constituent code elements;
determining, in a third language, a metaphor of the constituent code element based on the metaphoric element;
determining a mutated metaphor in response to applying a mutator to the metaphor; and
enabling access, in a fourth language, to a third code segment based on the mutated metaphor.

20. The non-transitory computer-readable medium of claim 19, wherein the operations further comprise:
enabling access to mutation performance data related a performance of the third code segment in execution; and
in response to passing a fuzzed input into the third code segment during execution, enabling access to fuzz performance data related to another performance of the third code segment in execution based on the fuzzed input.

* * * * *